Sept. 6, 1927.
K. R. ANDRE
1,641,519
ROTARY CASING SWAGE
Filed Sept. 2, 1924
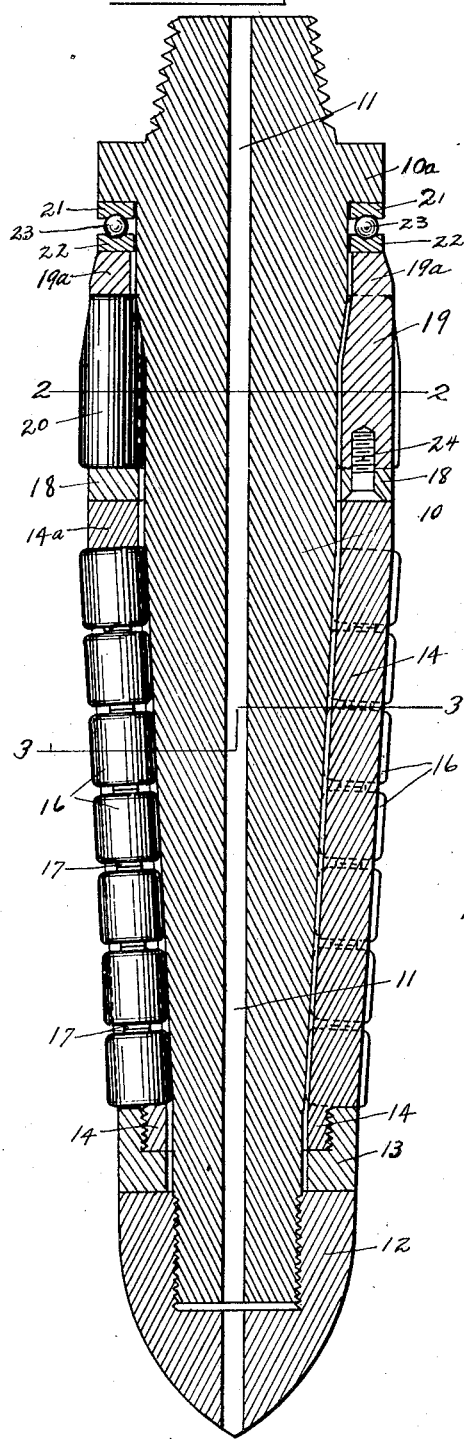
Fig. 1.
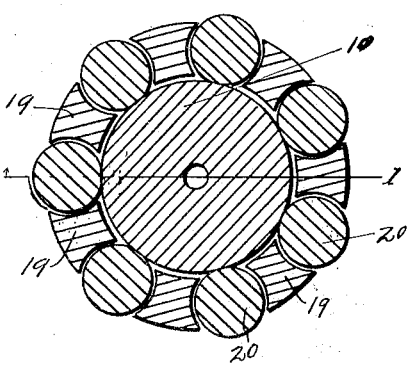
Fig. 2.
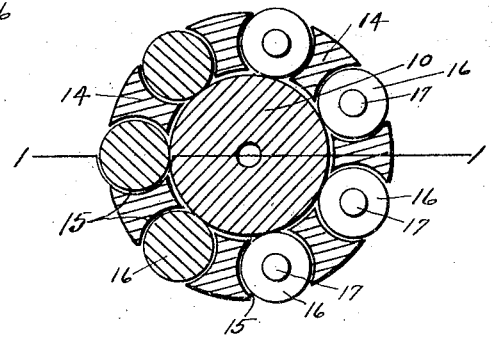
Fig. 3.
INVENTOR.
KARL R. ANDRE.
BY 
ATTORNEY Patented Sept. 6, 1927.

1,641,519

UNITED STATES PATENT OFFICE.

KARL R. ANDRE, OF LYNWOOD, CALIFORNIA.

ROTARY CASING SWAGE.

Application filed September 2, 1924. Serial No. 735,366.

My invention relates to swages and it has for its principal object to provide an improved swage for use in casing which can be operated with a minimum amount of friction, or drag on the roller elements which must bear against the inside of the casing and also against the cage or container which holds these elements, whether they be rollers or balls. In tools of this character now in use these anti-friction elements are carried in recesses in the body of the swage with their peripheries projecting sufficiently to engage with the inside of the casing. This contact or engagement of these elements with the walls of the recesses in which they turn results in much friction and frequently the friction is so great that the elements cannot roll. The object of my invention is to provide a swage with a core or body within a cage, with the antifriction elements carried by the cage and bearing on the inside on said core or body and turning thereon, while the peripheries of said elements outside of the cage engage with the inside of the pipe or casing in which the swage is operated. Another object of my invention is to provide a ball bearing thrust between the core or body and the cage. Another object is to provide in a swage of the character referred to a slight taper at the attached end thereof, whereby the swage will readily reenter a pipe or casing through which it has been forced and when it is withdrawn. Other objects and advantages of my invention will appear from the following description of one practical embodiment thereof, shown on the accompanying drawings.

On the drawings, Fig. 1 is a longitudinal sectional view of a swage embodying my invention;

Fig. 2 is a cross-sectional view thereof taken on line 2—2 of Fig. 1; and

Fig. 3 is a cross-sectional view thereof taken on line 3—3 of Fig. 1.

Referring more in detail to the drawings, I will describe the specific embodiment of my invention shown for illustrative purposes. The body or core is designated 10, with the usual circulation hole 11, therethrough. Its upper end is threaded and adapted to receive the usual operating case, while its lower end is provided with a nose piece 12, and a roller retaining ring, 13. A cage, 14, fits around said body and is provided with longitudinally extending, roller receiving openings, 15, in which are placed several series of rollers, 16, said rollers having spacing bosses, 17 thereon. The upper end 14ª, of ring form, of the cage 14, bears against a ring portion, 18, of an upper cage, 19, in which are mounted a plurality of roller elements, 20, said cage 19, also having a ring portion 19ª, at its upper end, as shown in Figs. 1 and 2. Between the ring portion 19ª, of the upper cage, 19, and an annular shoulder, 10ª, are two ball bearing rings, 21 and 22, between which are retained a series of balls, 23, said balls being retained in opposed grooves or runways in the adjacent faces of said rings, 21 and 22, as clearly indicated. These balls constitute a ball bearing thrust between the body, 10, and the cage, 19, as will be clear from the drawings. In the cage 19, the ring portion 18, may be secured to the spacing portions of the cage by means of screws, 24, and this ring is secured in place after the rollers 20 have been inserted endwise into their respective recesses. It will be understood, also, that the roller elements, 16, in the lower cage must be inserted endwise into their respective recesses, as they cannot be inserted sidewise between the cage members.

Thus I have provided a swage in which there is a body or core member which is turned in the casing to be rolled out, with a cage floating around the same and moving with the roller elements which bear against the body or core and also against the inside of the casing, and while I have shown but one embodiment of my invention for illustrative and descriptive purposes, with rollers as the anti-friction elements, I am aware that changes can be made within the spirit of the invention, and I do not limit the invention to the showing made, except as I may be limited by the hereto appended claims.

I claim:

1. A swage of the character shown and described including in combination a body member provided at its upper end with attaching means for securing it to an operating member and provided at its lower end with a nose piece screwed thereto, said body member being provided with an annular shoulder around its upper end, a cage having therein a plurality of roller receiving openings open at their opposite sides, a plurality of rollers in said openings, said rollers being of greater diameter than the thickness of the cage wall, whereby the peripheries of said rollers project beyond the outer and inner surfaces of said cage, said cage and rollers being placed over said body member in assembled form and being held in place by said nose piece and said annular shoulder, and ball-bearing means interposed between said annular shoulder and said cage.

2. A swage including in combination a tapering body, a tapering cage around said tapering body, a series of longitudinally extending rollers in said cage, each being of larger diameter than the thickness of said cage wall, and each roller being formed of a series of short roller sections in axial alinement with each other with spacing bosses therebetween, whereby said roller sections can turn independently of each other and said bosses reducing the friction between the ends of said roller sections.

3. A swage including a tapering body member with conduit therethrough, a cage rotatably mounted around said body and provided with longitudinally extending roller-receiving openings or pockets, a series of roller sections placed axially in alinement with each other in each of said roller-receiving pockets, said roller sections having spacing means therebetween of greatly reduced diameter to reduce friction between roller sections, the inner peripheries of said roller sections turning on said body and their outer peripheries projecting beyond said cage wall, substantially as shown.

Signed at Los Angeles, Los Angeles County, California, this 27th day of August, 1924.

KARL R. ANDRE.